(12) United States Patent
Hwang (10) Patent No.: US 10,072,531 B2
(45) Date of Patent: Sep. 11, 2018

(54) HYBRID POWER GENERATION SYSTEM USING SUPERCRITICAL CO2 CYCLE

(71) Applicant: DOOSAN HEAVY INDUSTRIES & CONSTRUCTION CO., LTD., Changwon-si, Gyeongsangnam-do (KR)

(72) Inventor: Jeong Ho Hwang, Yongin-si (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 124 days.

(21) Appl. No.: 15/074,207

(22) Filed: Mar. 18, 2016

(65) Prior Publication Data

US 2016/0305289 A1 Oct. 20, 2016

(30) Foreign Application Priority Data

Apr. 16, 2015 (KR) .................. 10-2015-0053992
Jan. 12, 2016 (WO) ............... PCT/KR2016/000273

(51) Int. Cl.
*F01K 11/02* (2006.01)
*F01K 25/10* (2006.01)
*F01D 15/10* (2006.01)
*F01K 7/22* (2006.01)
*F01K 7/32* (2006.01)
*H02K 7/18* (2006.01)

(52) U.S. Cl.
CPC .............. *F01K 11/02* (2013.01); *F01D 15/10* (2013.01); *F01K 7/22* (2013.01); *F01K 7/32* (2013.01); *F01K 25/103* (2013.01); *H02K 7/1823* (2013.01)

(58) Field of Classification Search
CPC .......... F01K 11/02; F01K 25/103; F01K 7/32; F01K 7/22; F01D 15/10; H02K 7/1823
USPC ................... 60/653, 677–680, 650, 682–684
See application file for complete search history.

(56) References Cited

U.S. PATENT DOCUMENTS

| | | | | |
|---|---|---|---|---|
| 2,653,447 A | * | 9/1953 | Heller | F01K 23/103 122/480 |
| 4,479,355 A | * | 10/1984 | Guide | F01K 23/06 60/655 |
| 4,720,968 A | * | 1/1988 | Knizia | F01K 23/06 60/39.182 |

(Continued)

FOREIGN PATENT DOCUMENTS

| | | |
|---|---|---|
| JP | 2010085078 A | 4/2010 |
| JP | 2012225228 A | 11/2012 |

*Primary Examiner* — Hoang Nguyen
(74) *Attorney, Agent, or Firm* — Sughrue Mion, PLLC (57) ABSTRACT

Disclosed herein is a hybrid power generation system using a supercritical $CO_2$ cycle, which includes a first working fluid circuit configured to produce electric power by a first working fluid heated in a boiler, and a second working fluid circuit configured to produce electric power by a second working fluid, and the first and second working fluid circuits share the boiler. The hybrid power generation system can remove an air preheater of a thermal power generation system and separate heat exchange units for exhaust gas and air after combustion, so as to utilize the heat exchange units as a heat source and a cooling source in a supercritical $CO_2$ cycle. Consequently, it is possible to improve power generation efficiency by recovering the leakage loss of the air preheater.

20 Claims, 3 Drawing Sheets (56) References Cited

U.S. PATENT DOCUMENTS

| | | | |
|---|---|---|---|
| 5,431,016 A * | 7/1995 | Simpkin | F01K 23/02 60/644.1 |
| 6,422,017 B1 * | 7/2002 | Bassily | F01K 7/40 60/653 |
| 8,166,761 B2 * | 5/2012 | Moghtaderi | F01K 25/08 60/651 |
| 8,783,037 B2 * | 7/2014 | Hayashi | H02K 7/1823 60/670 |

* cited by examiner

HYBRID POWER GENERATION SYSTEM USING SUPERCRITICAL CO2 CYCLE

CROSS-REFERENCE TO RELATED APPLICATIONS

This application claims priority to Korean Patent Application No. 10-2015-0053992, filed on Apr. 16, 2015, the disclosure of which is incorporated herein by reference in its entirety.

BACKGROUND

Field of the Invention

Exemplary embodiments of the present disclosure relate to a hybrid power generation system using a supercritical $CO_2$ cycle, and more particularly, to a hybrid power generation system using a supercritical $CO_2$ cycle, capable of removing an air preheater of a thermal power plant by means of using a supercritical $CO_2$ cycle.

Description of the Related Art

Internationally, the need to efficiently produce electric power has gradually increased, and various efforts have been performed in order to reduce generation of pollutants and increase power production since activities for reducing generation of pollutants are increased. One of them is a study on a power generation system using supercritical $CO_2$, which utilizes supercritical carbon dioxide as a working fluid, as disclosed in Korean Patent Laid-open Publication No. 2013-0036180.

The supercritical carbon dioxide simultaneously has a density similar to that of liquid and a viscosity similar to that of gas, thereby enabling the system to be miniaturized and the electric power required for compression and circulation of the fluid to be minimally consumed. In addition, it is easy to handle the supercritical carbon dioxide since the supercritical carbon dioxide has a smaller critical point of 31.4° C. and 72.8 atmospheres, compared to water having a critical point of 373.95° C. and 217.7 atmospheres. When the power generation system using supercritical $CO_2$ is operated at the temperature of 550° C., the system may have about 45% of net power generation efficiency, which is an improved power generation efficiency of 20% or more, compared to existing steam cycles, and the size of a turbo device may be reduced to one several tenth.

Meanwhile, a typical coal-fired thermal power generation system uses an air preheater in order to increase combustion efficiency by preheating air introduced into a boiler from the outside. An example of such an air preheater is disclosed in Korean Patent Laid-open Publication No. 2003-0058645.

The air preheater is typically a rotary air preheater. Outside air is introduced into the air preheater to be heated therein, and the heated air is introduced into the boiler. Combustion gas discharged from the boiler is used to heat outside air through heat exchange between the combustion gas and the outside air in the air preheater, and waste heat in the combustion gas is used in the air preheater.

However, the conventional rotary air preheater has a complicated structure, and a low efficiency since air flows into combustion gas and vice versa. In addition, the air preheater has a problem in that air or gas tends to leak due to gaps occurring therein.

PRIOR ART DOCUMENT

Patent Document (Patent Document 1) Korean Patent Laid-open Publication No. 2013-0036180 (Apr. 11, 2013)

(Patent Document 2) Korean Patent Laid-open Publication No. 2003-0058645 (Jul. 7, 2003)

SUMMARY

An object of the present disclosure is to provide a hybrid power generation system using a supercritical $CO_2$ cycle, capable of removing an air preheater of a thermal power generation system and separating heat exchange units for exhaust gas and air after combustion, so as to utilize the heat exchange units as a heat source and a cooling source in a supercritical $CO_2$ cycle.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a hybrid power generation system using a supercritical $CO_2$ cycle includes a first working fluid circuit configured to produce electric power by a first working fluid heated in a boiler, and a second working fluid circuit configured to produce electric power by a second working fluid, wherein the first and second working fluid circuits share the boiler.

The second working fluid circuit may form a closed loop such that the second working fluid is circulated only in the second working fluid circuit.

The first working fluid may be liquid- or gas-phase water, and the second working fluid may be a supercritical $CO_2$ fluid.

The first working fluid circuit may include a plurality of turbines driven by the first working fluid discharged from the boiler, a generator connected to one of the turbines to produce electric power, and a plurality of heat exchangers configured to exchange heat with the first working fluid discharged from at least one of the turbines, and the first working fluid may be transferred to the boiler via the turbines and the heat exchangers.

The boiler may include an economizer configured to exchange heat with the first working fluid passing through the turbines and the heat exchangers.

The heat exchangers may be feed water heaters to heat the first working fluid, and the economizer may be a heater to heat the first working fluid by recovering waste heat of exhaust gas discharged after combustion of fuel in the boiler.

The second working fluid circuit may include a first heat exchanger to recover waste heat of exhaust gas discharged from the boiler.

The second working fluid circuit may further include a second heat exchanger to heat outside air introduced into the boiler for combustion of fuel.

The second working fluid circuit may include a third heat exchanger provided in the boiler to heat the second working fluid, a second circuit turbine driven by the second working fluid heated through the third heat exchanger, and a compressor to compress the second working fluid used to drive the second circuit turbine.

The second working fluid may be introduced into the second heat exchanger via the second circuit turbine so as to be cooled, and then introduced to the compressor, and the second working fluid compressed by the compressor may be heated through the first heat exchanger and then introduced into the third heat exchanger so as to be heated by heat of the boiler.

The first working fluid circuit may further include an exhaust line connected to a rear end of the boiler such that the exhaust gas is discharged through the exhaust line, and the first heat exchanger may be installed on the exhaust line.

The first working fluid circuit may further include an outside air line connected to a front end of the boiler such that the outside air is introduced through the outside air line, and the second heat exchanger may be installed on the outside air line.

The second working fluid circuit may further include a generator connected to the second circuit turbine to be driven by the second circuit turbine for producing electric power.

The first working fluid circuit may further include a feed water pump configured to supply the first working fluid to the feed water heater.

The second circuit turbine may be connected to the feed water pump to drive the feed water pump.

In accordance with another aspect of the present disclosure, a hybrid power generation system using a supercritical $CO_2$ cycle includes a first working fluid circuit including a boiler to heat a first working fluid, a plurality of turbines driven by the first working fluid discharged from the boiler, a generator connected to one of the turbines to produce electric power, and a plurality of feed water heaters configured to exchange heat with the first working fluid discharged from at least one of the turbines, the first working fluid being transferred to the boiler via the turbines and the feed water heaters, and a second working fluid circuit including a third heat exchanger provided in the boiler to heat a second working fluid, a second circuit turbine driven by the second working fluid heated through the third heat exchanger, and a compressor to compress the second working fluid used to drive the second circuit turbine, wherein the second working fluid circuit forms a closed loop such that the second working fluid is circulated only in the second working fluid circuit.

The first working fluid may be liquid- or gas-phase water, and the second working fluid may be a supercritical $CO_2$ fluid.

The boiler may further include an economizer configured to exchange heat with the first working fluid passing through the turbines and the feed water heaters, and the economizer may be a heater to heat the first working fluid by recovering waste heat of exhaust gas discharged after combustion of fuel in the boiler.

The second working fluid circuit may further include a first heat exchanger to recover waste heat of exhaust gas discharged from the boiler, and a second heat exchanger to heat outside air introduced into the boiler for combustion of fuel.

The second working fluid may be introduced into the second heat exchanger via the second circuit turbine so as to be cooled, and then introduced to the compressor, and the second working fluid compressed by the compressor may be heated through the first heat exchanger and then introduced into the third heat exchanger so as to be heated by heat of the boiler.

The first working fluid circuit may further include an exhaust line connected to a rear end of the boiler such that the exhaust gas is discharged through the exhaust line, and an outside air line connected to a front end of the boiler such that the outside air is introduced through the outside air line, the first heat exchanger may be installed on the exhaust line, and the second heat exchanger may be installed on the outside air line.

The second working fluid circuit may further include a generator connected to the second circuit turbine to be driven by the second circuit turbine for producing electric power.

The first working fluid circuit may further include a feed water pump configured to supply the first working fluid to the feed water heaters, and the second circuit turbine may be connected to the feed water pump to drive the feed water pump.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

A hybrid power generation system using a supercritical $CO_2$ cycle according to exemplary embodiments of the present disclosure will be described below in more detail with reference to the accompanying drawings.

The hybrid power generation system using a supercritical $CO_2$ cycle according to the present disclosure is a hybrid power generation system capable of improving both efficiencies of two power generation system by means of using a coal-fired thermal power generation system as a bottom cycle and using a power generation system using supercritical $CO_2$ as a topping cycle. Hereinafter, only main components of the coal-fired thermal power generation system and the hybrid power generation system using a supercritical $CO_2$ cycle will be described for convenience' sake.

Figure 1:
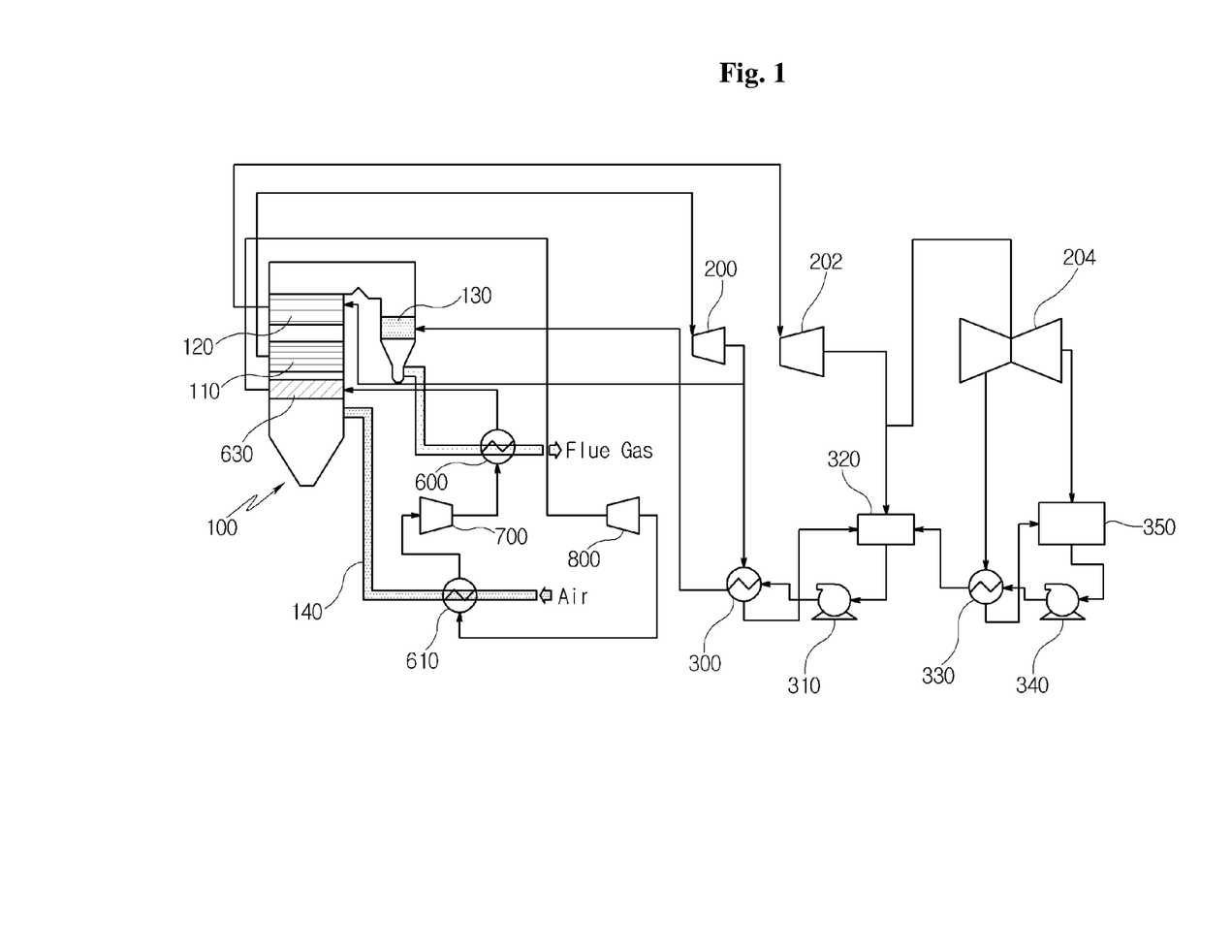
FIG. 1 is a diagram illustrating a hybrid power generation system using a supercritical $CO_2$ cycle according to an embodiment of the present disclosure.

FIG. 1 is a diagram illustrating a hybrid power generation system using a supercritical $CO_2$ cycle according to an embodiment of the present disclosure.

The hybrid power generation system using a supercritical $CO_2$ cycle according to the embodiment is a hybrid power generation system capable of improving both efficiencies of two power generation system by means of using a coal-fired thermal power generation system as a bottom cycle and using a power generation system using supercritical $CO_2$ as a topping cycle. Hereinafter, the bottom cycle is defined as a first working fluid circuit and the topping cycle is defined as a second working fluid circuit, according to working fluids.

As illustrated in FIG. 1, the first working fluid circuit according to the embodiment is a steam cycle in which fossil fuel such as coal are supplied to and burned in a boiler 100 and water is converted into steam through supply of thermal energy generated by the boiler 100 to a steam generator (not shown). A first working fluid in the first working fluid circuit is present as liquid-phase water or gas-phase steam for each section of the circuit, the components constituting the steam cycle are as follows.

Steam passing through a superheater 110 in the boiler 100 is supplied to a high-pressure turbine (HP) 200 and is used to drive the high-pressure turbine 200. Steam passing through a reheater 120 in the boiler 100 is supplied to an intermediate-pressure turbine (IP) 202 and is used to drive the intermediate-pressure turbine 202.

A portion of steam expanded through the high-pressure turbine 200 is supplied to and reheated in the reheater 120 of the boiler 100, and is then transferred to the intermediate-pressure turbine 202. The remainder of steam expanded through the high-pressure turbine 200 is introduced into a feed water heater 300, and is then transferred to an economizer 130 of the boiler 100.

A portion of steam expanded through the intermediate-pressure turbine 202 is supplied to a low-pressure turbine (LP) 204 and is used to drive the low-pressure turbine 204 and a generator (not shown) connected to the low-pressure turbine 204. The remainder of steam expanded through the intermediate-pressure turbine 202 is introduced into a deaerator 320 so that air is separated therefrom, and it is transferred to the feed water heater 300 through a feed water pump 310 after separation of air. The steam heated by the feed water heater 300 is transferred to the economizer 130 of the boiler 100.

After the steam passing through the low-pressure turbine 204 is heated via a second feed water heater 330, it is transferred to the deaerator 320 and then to the economizer 130. The generator (not shown) is connected to the low-pressure turbine 204, and the steam discharged after driving of the generator is cooled by a condenser 350 to be recovered as water again. Water passing through the condenser 350 is supplied to the second feed water heater 330 by a second feed water pump 340 so as to be primarily heated. The heated water is finally transferred to the economizer 130 via the deaerator 320.

The economizer 130 converts the supplied water into steam by heating the water using waste heat of exhaust gas discharged after combustion of fuel in the boiler 100, and then supplies the steam to a steam line. In addition, all of the above-mentioned feed water pumps preferably include individual drive motors for driving them.

Meanwhile, the second working fluid circuit according to the embodiment is a supercritical $CO_2$ cycle, a second working fluid is a supercritical $CO_2$ fluid. The supercritical carbon dioxide is activated when both temperature and pressure are equal to or greater than a critical point, and may be present as liquid phase depending on the temperature of air in a second heat exchanger.

The "power generation system using a supercritical $CO_2$ cycle" in the embodiment of the present disclosure includes a system in which most of working fluids are supercritical fluids and the remainder thereof is a subcritical fluid, as well as a system in which all working fluids flowing in the cycle are supercritical fluids.

In addition, the "carbon dioxide" used as a working fluid in the embodiment of the present disclosure includes pure carbon dioxide in the chemical viewpoint, carbon dioxide with few impurities in the general viewpoint, and carbon dioxide mixed with one or more fluids as additives.

The second working fluid circuit in the embodiment forms a closed loop in which the carbon dioxide used to generate electric power is not discharged to the outside.

The second working fluid circuit shares the boiler 100 of the first working fluid circuit. That is, a supercritical $CO_2$ heater (hereinafter, referred to as a "S—CO heater") 630 for heating a working fluid is installed to the high-temperature part in the boiler 100, so that the working fluid passes through the boiler 100 and is circulated in the supercritical $CO_2$ cycle.

The constituent components of the supercritical $CO_2$ cycle are as follows.

A high-pressure supercritical $CO_2$ fluid as a working fluid is heated to an optimal process temperature by the S—CO heater 630 (which is a third heat exchanger to be described later). The working fluid passing through the S—CO heater 630 is used to drive a second circuit turbine 800. The generator (not shown) is connected to the second circuit turbine 800 to be driven by the second circuit turbine 800. The generator connected to the second circuit turbine 800 produces electric power and assists electric energy produced in the steam cycle.

The high-temperature and low-pressure working fluid passing through the second circuit turbine 800 is cooled by a cooler 610 (which is a second heat exchanger to be described later). The low-temperature and low-pressure working fluid cooled by the cooler 610 is pressurized to have a pressure of 200 atmospheres or more in a compressor 700. Subsequently, the pressurized working fluid exchanges heat in an exhaust heater 600 (which is a first heat exchanger to be described later), and is then reintroduced into the S—CO heater 630. These components form a closed cycle, and the supercritical $CO_2$ fluid is circulated in the closed cycle. The supercritical $CO_2$ cycle may further include a preheater for preheating air introduced into the steam cycle from the outside, a recompressor for assisting the function of the compressor, a heat exchanger installed between the compressor and the recompressor, etc., in addition to the above-mentioned components. Hereinafter, only necessary components of the present invention will be described for convenience' sake.

Meanwhile, outside air has to be supplied to the boiler 100 for combustion of fuel in the boiler 100, and the outside air is conventionally heated by an air preheater in order to increase combustion efficiency. However, the present disclosure proposes a structure in which an existing air preheater is removed and heat exchange lines for exhaust gas and outside air are separated so as to utilize the separated heat exchange lines as a heat source and a cooling source in the supercritical $CO_2$ cycle.

As illustrated in FIG. 1, a first heat exchanger 600 is provided on an exhaust line 150 through which exhaust gas is discharged from the rear end of the boiler 100, and a second heat exchanger 610 is provided on an outside air line 140 into which outside air is introduced. In addition, a third heat exchanger 630 is provided in the high-temperature part of the boiler 100, and the working fluid passing through the third heat exchanger 630 is supplied to the second circuit turbine 800. The working fluid used to drive the second circuit turbine 800 is introduced into the second heat exchanger 610.

Here, the second heat exchanger 610 corresponds to the above-mentioned cooler of the supercritical $CO_2$ cycle, and the third heat exchanger 630 corresponds to the S—CO heater. Hereinafter, the cooler will be described as the second heat exchanger, and the S—CO heater will be described as the third heat exchanger.

The exhaust gas discharged from the boiler 100 has a temperature of about 300° C. or more, but has to be discharged at a temperature of about 120° C. so as to be suitable for emission regulations. To this end, there is provided the first heat exchanger 600. The first heat exchanger 600 serves to recover heat from exhaust gas, similarly to an existing air preheater. The heat recovered by the first heat exchanger 600 is used to heat a working fluid, thereby becoming driving force for driving the second circuit turbine 800 by a high-temperature fluid.

Meanwhile, air introduced from the outside has to be introduced into the boiler 100 in the state in which it is increased to a temperature of about 300° C. or more from the atmospheric temperature for combustion efficiency. Heat required to increase the temperature of outside air is supplied from the second and third heat exchangers 610 and 630.

That is, the supercritical $CO_2$ fluid discharged from the second circuit turbine 800 may be cooled through contact with cold air in the second heat exchanger 610, and outside air may be primarily heated by the supercritical $CO_2$ fluid. A working fluid is cooled in the second heat exchanger 610, and is then circulated to the first heat exchanger 600 via the compressor 700. The primarily heated outside air is supplied into the boiler 100, and is secondarily heated by the third heat exchanger 630 located at the high-temperature part of the boiler 100. Consequently, it is possible to obtain a heat quantity required to maintain the combustion efficiency of the boiler 100.

The waste heat of exhaust gas discharged from the boiler of the first working fluid circuit has been described as being used to drive the second circuit turbine of the second working fluid circuit, and the heat required to increase the temperature of outside has been described as being supplied from the second and third heat exchangers, in the above-mentioned embodiment. However, the second circuit turbine may be used to drive the feed water pump. The same components as those of the above-mentioned embodiment will be omitted for convenience' sake.

Figure 2:
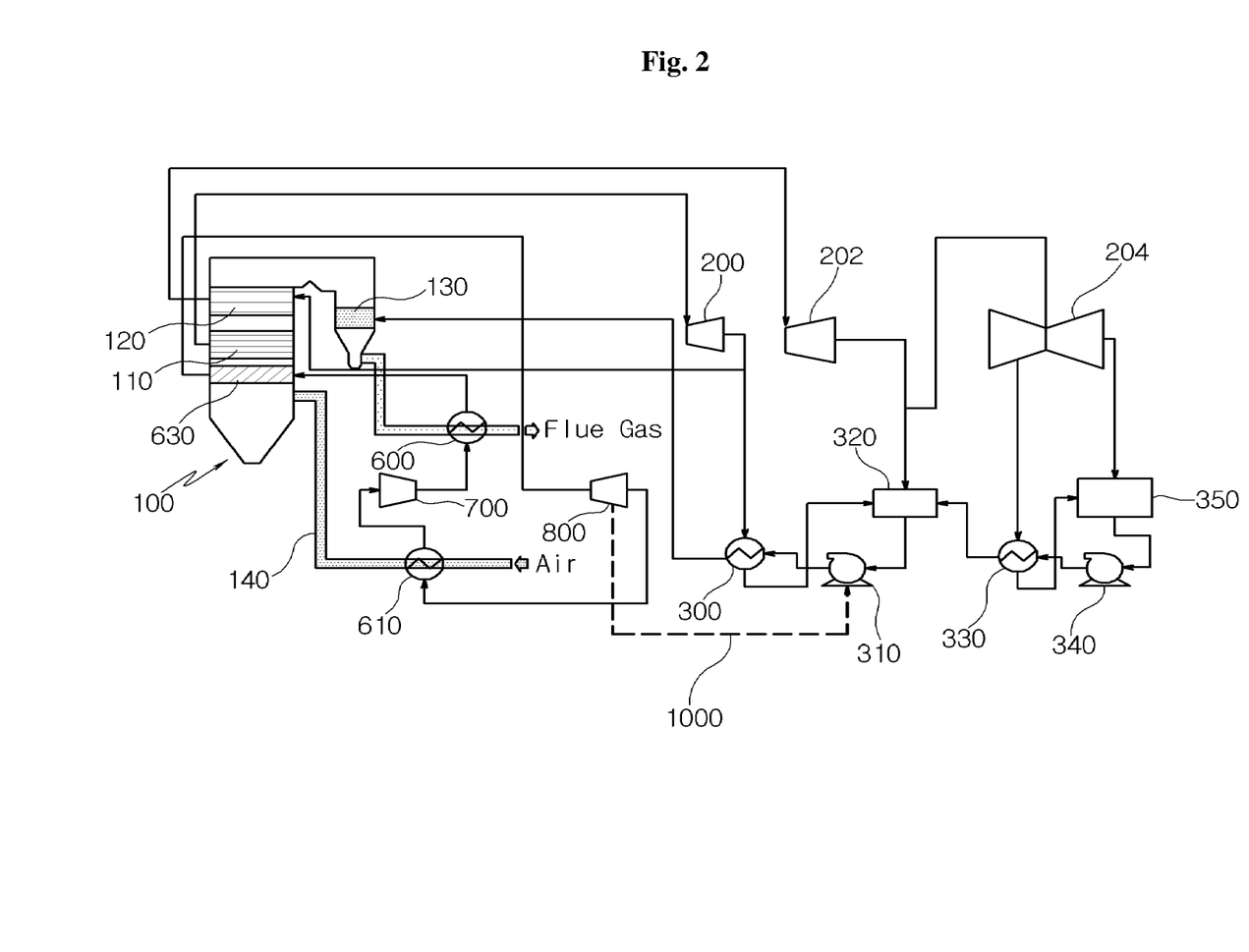
FIG. 2 is a diagram illustrating a hybrid power generation system using a supercritical $CO_2$ cycle according to another embodiment of the present disclosure.

FIG. 2 is a diagram illustrating a hybrid power generation system using a supercritical $CO_2$ cycle according to another embodiment of the present disclosure.

As illustrated in FIG. 2, in a supercritical $CO_2$ cycle, a second circuit turbine 800 driven by supercritical carbon dioxide as a working fluid may be used as a drive source for driving a feed water pump 310 of a first working fluid circuit. When the second circuit turbine 800 is used to drive the feed water pump 310 of the first working fluid circuit, a separate generator is not connected to the second circuit turbine 800. Instead, the second circuit turbine 800 is provided with a drive shaft 1000 to be connected to the feed water pump 310 so as to supply driving force to the feed water pump 310, or the second circuit turbine 800 may be equipped with a gear set or the like for transferring the driving force of the second circuit turbine 800 to the feed water pump 310. Any drive transfer means may be applied regardless of the kinds thereof so long as the driving force of the second circuit turbine 800 may be transferred to the feed water pump 310.

In the hybrid power generation system using a supercritical $CO_2$ cycle described in the embodiments of the present disclosure, the flow of working fluid and heat exchange thereof will be described in more detail below.

Figure 3:
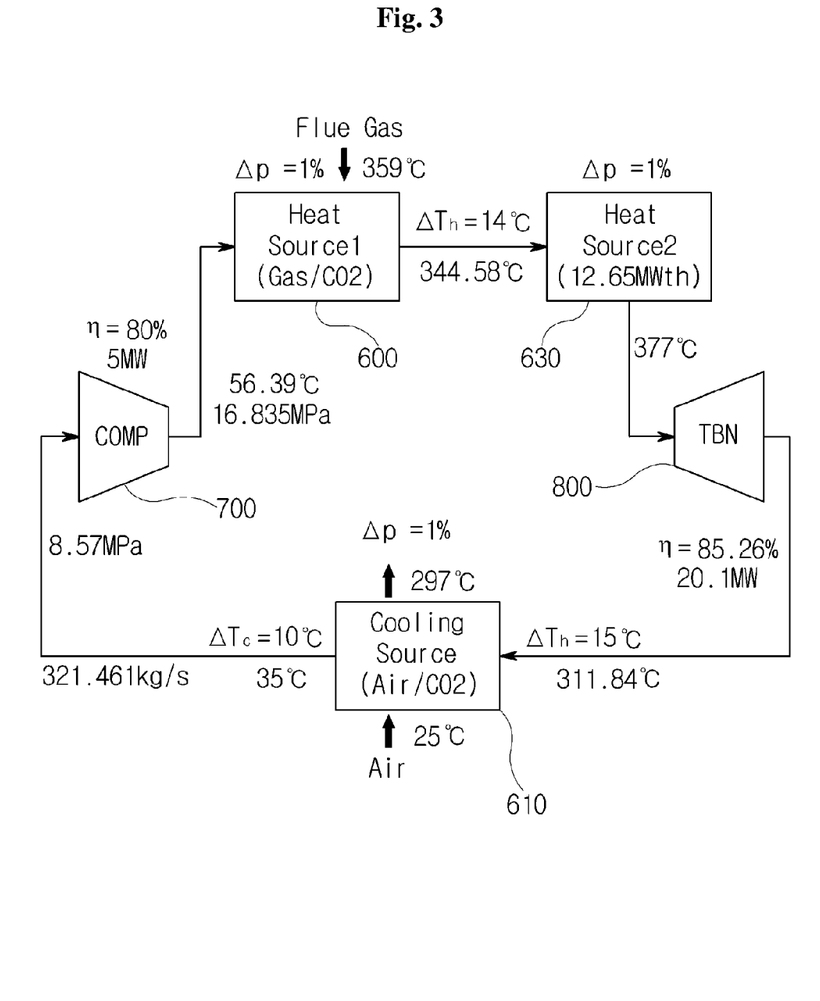
FIG. 3 is a block diagram illustrating an example of fluid flow and heat exchange in the hybrid power generation systems of FIGS. 1 and 2.

FIG. 3 is a block diagram illustrating an example of fluid flow and heat exchange in the hybrid power generation systems of FIGS. 1 and 2. The temperature, heat quantity, and the electric energy illustrated in FIG. 3 are merely by way of example, and they may vary according to the configuration of a cycle or the capacity and efficiency of a boiler.

As illustrated in FIG. 3, in the hybrid power generation system using a supercritical $CO_2$ cycle according to the embodiments of the present disclosure, exhaust gas may discharged at a temperature of about 360° C. from the boiler 100 to exchange heat with a working fluid in the first heat exchanger 600, and then may be discharged at a temperature of about 120° C.

In this case, the working fluid is introduced as a low-temperature and high-pressure fluid via the compressor 700, and is heated to a temperature of about 340° C. through heat exchange with exhaust gas. In the viewpoint of supercritical $CO_2$ cycle, since the first heat exchanger 600 serves to heat a working fluid, the first heat exchanger 600 functions as a heat source of the supercritical $CO_2$ cycle. When the air preheater is used as in the prior art, a leakage loss is caused. However, in the hybrid power generation system according to the embodiments of the present disclosure, the first heat exchanger 600 recovers about 2% of the leakage loss.

The working fluid heated in the first heat exchanger 600 is heated enough to drive the second circuit turbine 800 while passing through the third heat exchanger 630 located at the high-temperature part of the boiler 100 in the steam cycle. The working fluid absorbing thermal energy of about 12.65 MW in the third heat exchanger 630 is heated to a temperature of about 375° C. to be a high-temperature and high-pressure working fluid. In this case, the high-temperature and high-pressure working fluid is used to drive the second circuit turbine 800. In the viewpoint of supercritical $CO_2$ cycle, the third heat exchanger 630 also functions as a heat source for heating a working fluid.

When the high-temperature and high-pressure working fluid is used to drive the second circuit turbine 800, the enthalpy ($\eta$) thereof is about 85%. In this case, the electric energy produced by the generator connected to the second circuit turbine 800 reaches 20.1 MW.

The working fluid lowered to a temperature of about 310° C. after power production is transferred to the second heat exchanger 610. The working fluid in the second heat exchanger 610 is cooled to a temperature of about 35° C. through heat exchange with outside air having a room temperature of about 25° C., and is then transferred to the compressor 700. In this case, the outside air exchanges heat with the working fluid in the second heat exchanger 610 to be heated to a temperature of about 300° C., and is then introduced into the boiler 100 to be used to burn fuel. In the viewpoint of supercritical $CO_2$ cycle, since the second heat exchanger 610 serves to cool a supercritical $CO_2$ fluid as a working fluid, the second heat exchanger 610 functions as a cooling source of the supercritical $CO_2$ cycle.

The working fluid introduced into the compressor 700 is compressed to a pressure of about 16.8 MPa from a pressure of about 8.5 MPa, and is increased to a temperature of about 55° C. In this state, the working fluid is circulated to the first heat exchanger 600. The electric energy used for compression of working fluid when the compressor 700 is driven is about 5 MW, and the enthalpy ($\eta$) thereof is about 80%.

In the working fluid passing through the first, second, and third heat exchangers 600, 610, and 630, a pressure drop of about 1% occurs in each of the heat exchangers.

As described above, the present disclosure removes the air preheater of the steam cycle, and installs respective heat exchangers to the heat exchange part for exhaust gas and the heat exchange part for outside air so as to utilize the heat exchangers as a heat source and a cooling source in the supercritical $CO_2$ cycle. Thus, it is possible to recover about 2% of the leakage loss of the existing air preheater and to utilize the same to generate electric power in the supercritical $CO_2$ cycle. Therefore, the hybrid power generation system using a supercritical $CO_2$ cycle can have improved efficiency. When about 2% of the leakage loss is recovered and it is used to generate electric power, it is possible to increase about 0.2% of power generation efficiency in the whole power generation system.

As is apparent from the above description, a hybrid power generation system using a supercritical $CO_2$ cycle according to exemplary embodiments of the present disclosure can remove an air preheater of a thermal power generation system and separate heat exchange units for exhaust gas and air after combustion, so as to utilize the heat exchange units as a heat source and a cooling source in a supercritical $CO_2$ cycle. Consequently, it is possible to improve power generation efficiency by recovering the leakage loss of the air preheater.

While the present disclosure has been described with respect to the specific embodiments, it will be apparent to those skilled in the art that various changes and modifications may be made without departing from the spirit and scope of the invention as defined in the following claims.

What is claimed is:

1. A hybrid power generation system using a supercritical CO2 cycle, comprising:
    a boiler;
    a first working fluid circuit configured to produce electric power by a first working fluid heated in the boiler; and
    a second working fluid circuit configured to produce electric power by a second working fluid heated in the boiler,
    wherein the first and second working fluid circuits share the boiler.

2. The hybrid power generation system according to claim 1, wherein the second working fluid circuit forms a closed loop such that the second working fluid is circulated only in the second working fluid circuit, the first working fluid is liquid- or gas-phase water, and the second working fluid is a supercritical CO2 fluid.

3. The hybrid power generation system according to claim 2, wherein the first working fluid circuit comprises a plurality of turbines driven by the first working fluid discharged from the boiler, wherein at least one of the turbines is configured to be connected to a generator to produce electric power, and a plurality of heat exchangers configured to exchange heat with the first working fluid discharged from at least one of the turbines, and the first working fluid is transferred to the boiler via the turbines and the heat exchangers.

4. The hybrid power generation system according to claim 3, wherein the boiler comprises an economizer configured to exchange heat with the first working fluid passing through the turbines and the heat exchangers.

5. The hybrid power generation system according to claim 4, wherein the heat exchangers are feed water heaters configured to heat the first working fluid, and the economizer is a heater configured to heat the first working fluid by recovering waste heat of exhaust gas discharged from the boiler after combustion of fuel in the boiler.

6. The hybrid power generation system according to claim 3, wherein the second working fluid circuit comprises a first heat exchanger configured to recover waste heat of exhaust gas discharged from the boiler, and a second heat exchanger configured to heat outside air introduced into the boiler for combustion of fuel.

7. The hybrid power generation system according to claim 6, wherein the second working fluid circuit comprises a third heat exchanger provided in the boiler to heat the second working fluid, a second circuit turbine driven by the second working fluid heated through the third heat exchanger, and a compressor configured to compress the second working fluid that drives the second circuit turbine.

8. The hybrid power generation system according to claim 7, wherein the second working fluid is introduced into the second heat exchanger via the second circuit turbine so as to be cooled, and is then introduced to the compressor, and the second working fluid compressed by the compressor is heated through the first heat exchanger and is then introduced into the third heat exchanger so as to be heated by heat of the boiler.

9. The hybrid power generation system according to claim 6, wherein the first working fluid circuit further comprises an exhaust line connected to a rear end of the boiler such that the exhaust gas of the boiler is discharged through the exhaust line, and the first heat exchanger is installed on the exhaust line.

10. The hybrid power generation system according to claim 7, wherein:
    the first working fluid circuit further comprises an outside air line connected to a front end of the boiler such that the outside air is introduced through the outside air line into the boiler, the second heat exchanger is installed on the outside air line, and
    the second working fluid circuit further comprises a generator connected to the second circuit turbine to be driven by the second circuit turbine for producing electric power.

11. The hybrid power generation system according to claim 7, wherein the first working fluid circuit further comprises a feed water pump configured to supply the first working fluid to the feed water heater.

12. The hybrid power generation system according to claim 11, wherein the second circuit turbine is connected to the feed water pump to drive the feed water pump.

13. A hybrid power generation system using a supercritical CO2 cycle, comprising:
    a first working fluid circuit comprising a boiler to heat a first working fluid, a plurality of turbines driven by the first working fluid discharged from the boiler, a generator connected to one of the turbines to produce electric power, and a plurality of feed water heaters configured to exchange heat with the first working fluid discharged from at least one of the turbines, the first working fluid being transferred to the boiler via the turbines and the feed water heaters; and
    a second working fluid circuit comprising a third heat exchanger provided in the boiler to heat a second working fluid, a second circuit turbine driven by the second working fluid heated through the third heat exchanger, and a compressor to compress the second working fluid used to drive the second circuit turbine,
    wherein the second working fluid circuit forms a closed loop such that the second working fluid is circulated only in the second working fluid circuit.

14. The hybrid power generation system according to claim 13, wherein the first working fluid is liquid- or gas-phase water, and the second working fluid is a supercritical CO2 fluid.

15. The hybrid power generation system according to claim 14, wherein the boiler further comprises an economizer configured to exchange heat with the first working fluid passing through the turbines and the feed water heaters, and the economizer is a heater to heat the first working fluid by recovering waste heat of exhaust gas discharged after combustion of fuel in the boiler.

16. The hybrid power generation system according to claim 14, wherein the second working fluid circuit further comprises a first heat exchanger configured to recover waste heat of exhaust gas discharged from the boiler, and a second heat exchanger configured to heat outside air introduced into the boiler for combustion of fuel.

17. The hybrid power generation system according to claim 16, wherein the second working fluid is introduced into the second heat exchanger via the second circuit turbine so as to be cooled, and is then introduced to the compressor, and the second working fluid compressed by the compressor is heated through the first heat exchanger and is then introduced into the third heat exchanger so as to be heated by heat of the boiler.

18. The hybrid power generation system according to claim 16, wherein the first working fluid circuit further comprises an exhaust line connected to a rear end of the boiler such that the exhaust gas is discharged from the boiler through the exhaust line, and an outside air line connected to a front end of the boiler such that the outside air is introduced into the boiler through the outside air line, the first heat exchanger is installed on the exhaust line, and the second heat exchanger is installed on the outside air line.

19. The hybrid power generation system according to claim 13, wherein the second working fluid circuit further comprises a generator connected to the second circuit turbine to be driven by the second circuit turbine for producing electric power.

20. The hybrid power generation system according to claim 13, wherein the first working fluid circuit further comprises a feed water pump configured to supply the first working fluid to the feed water heaters, and the second circuit turbine is connected to the feed water pump to drive the feed water pump.

* * * * *